United States Patent
Komatsu et al.

(10) Patent No.: US 8,428,803 B2
(45) Date of Patent: Apr. 23, 2013

(54) HYBRID VEHICLE AND METHOD FOR CONTROLLING HYBRID VEHICLE

(75) Inventors: Masayuki Komatsu, Aichi-ken (JP);
Kazuyoshi Obayashi, Aichi-ken (JP);
Hiroki Sawada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 210 days.

(21) Appl. No.: 12/452,445

(22) PCT Filed: Jul. 9, 2008

(86) PCT No.: PCT/JP2008/062779
§ 371 (c)(1),
(2), (4) Date: Feb. 12, 2010

(87) PCT Pub. No.: WO2009/008546
PCT Pub. Date: Jan. 15, 2009

(65) Prior Publication Data
US 2010/0145560 A1    Jun. 10, 2010

(30) Foreign Application Priority Data
Jul. 12, 2007  (JP) ................................. 2007-183307

(51) Int. Cl.
*G06F 7/00*   (2006.01)
(52) U.S. Cl.
USPC .......................................................... 701/22
(58) Field of Classification Search .................... 701/22, 701/36, 69; 180/65.21, 65.29, 65.265
See application file for complete search history.

(56) References Cited

U.S. PATENT DOCUMENTS

| 2006/0180362 A1 | 8/2006 | Yamaguchi et al. |
| 2009/0101421 A1* | 4/2009 | Oyobe et al. ................ 180/65.29 |

FOREIGN PATENT DOCUMENTS

| EP | 1 738 947 A2 | 1/2007 |
| EP | 1 920 985 A1 | 5/2008 |
| EP | 1 920 986 A1 | 5/2008 |
| JP | A 9-168206 | 6/1997 |
| JP | A 2001-190007 | 7/2001 |
| JP | A 2003-23703 | 1/2003 |
| JP | A 2004-343888 | 12/2004 |

(Continued)

OTHER PUBLICATIONS

Extended European Search Report issued in European Application No. 08778196.9 dated May 19, 2011.

(Continued)

*Primary Examiner* — Kim T Nguyen
(74) *Attorney, Agent, or Firm* — Oliff & Berridge, PLC

(57) ABSTRACT

An EV priority switch is configured to allow a user to request a change between an EV priority mode and an HV mode. If an SOC of a power storage device is less than a first threshold value when the change to the HV mode is requested from the EV priority switch during the EV priority mode, an ECU changes the running mode to attain the HV mode and controls the SOC to be close to the SOC at the moment of a request for the change to the HV mode. If the SOC is greater than or equal to the first threshold value, the ECU maintains the EV priority mode. If the SOC reaches a second threshold value less than the first threshold value, the ECU forcefully changes the running mode to attain the HV mode.

20 Claims, 7 Drawing Sheets

FOREIGN PATENT DOCUMENTS

| | | |
|---|---|---|
| JP | A 2005-51863 | 2/2005 |
| JP | A 2006-50836 | 2/2006 |
| JP | A 2007-8349 | 1/2007 |
| JP | A 2007-49791 | 2/2007 |
| JP | A 2007-62638 | 3/2007 |
| JP | A 2007-62639 | 3/2007 |
| JP | A 2007-118918 | 5/2007 |
| WO | WO 2007/026941 A1 | 3/2007 |
| WO | WO 2007/026946 A1 | 3/2007 |

OTHER PUBLICATIONS

Office Action issued in corresponding Japanese Application No. 2009-014200, mailed Aug. 17, 2010. (with English-language translation).

Translation and International Search Report issued in corresponding International Application No. PCT/JP2008/062779, mailed Oct. 21, 2008.

International Search Report mailed Oct. 21, 2008 in counterpart International Application No. PCT/JP2008/062779.

* cited by examiner

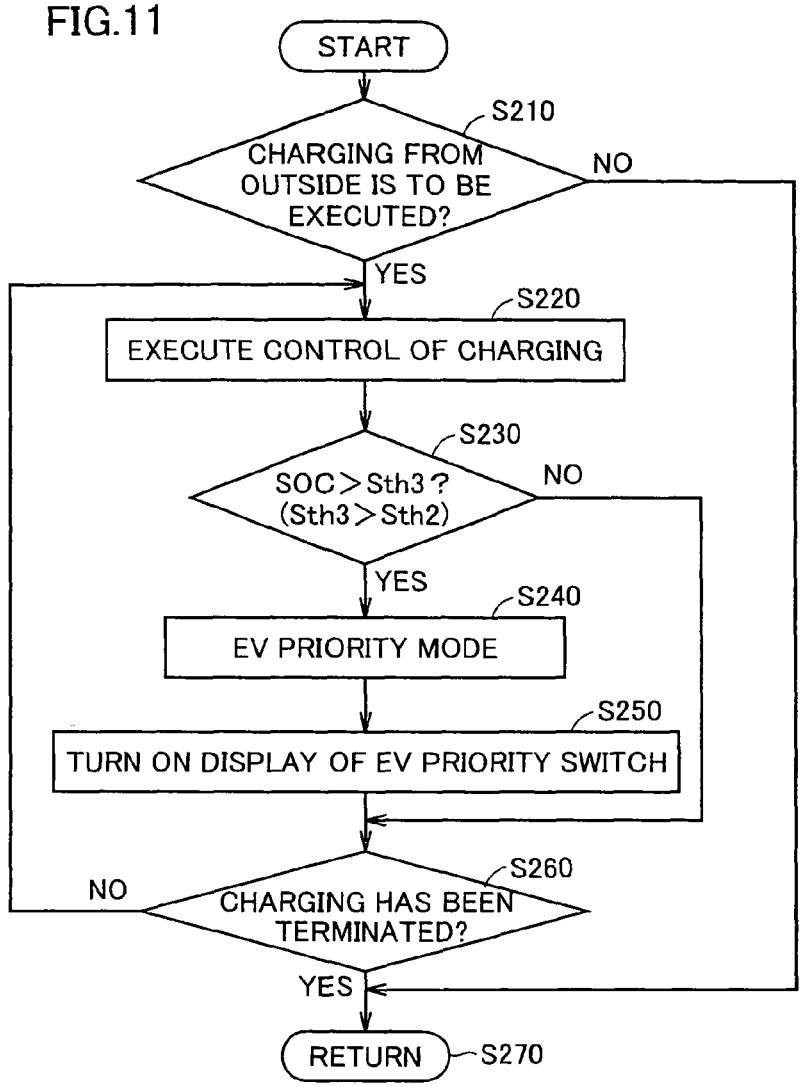
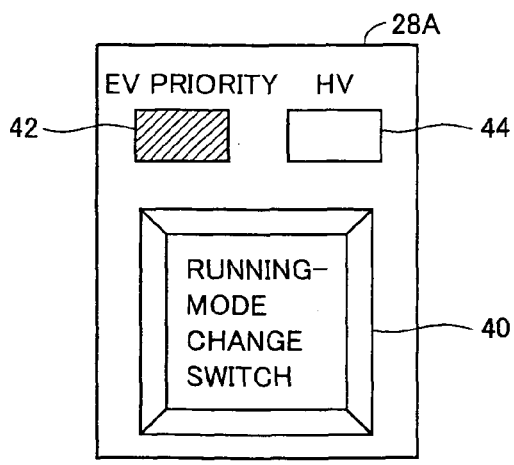

HYBRID VEHICLE AND METHOD FOR CONTROLLING HYBRID VEHICLE

TECHNICAL FIELD

The present invention relates to a hybrid vehicle including an internal combustion engine and an electric motor generating driving force for the vehicle, and to a method for controlling such hybrid vehicle.

BACKGROUND ART

A hybrid vehicle has received attention as an environmentally friendly vehicle. In addition to a conventional internal combustion engine, the hybrid vehicle is equipped with a power storage device, an inverter and an electric motor driven by the inverter, as power sources for the vehicle to run.

Japanese Patent Laying-Open No. 9-168206 discloses such a hybrid vehicle in which necessary regeneration energy can be recovered to a battery in any running state. In this hybrid vehicle, a detection signal of a battery capacity, a signal indicative of an expected running state from a navigation system and a signal indicative of an actual vehicle running state are received as input signals to control the battery capacity to be constantly close to a target amount of charge α while ensuring charging energy (100−α) for regeneration. A driver is allowed to manually set the target amount of charge α.

According to this hybrid vehicle, the battery capacity is controlled in comparison with the target amount of charge α, which allows necessary regenerative energy to be recovered to the battery in any running state.

Recently, a great deal of attention has been given to a hybrid vehicle in which an on-vehicle power storage device can be charged from a power source outside the vehicle. Such an externally rechargeable hybrid vehicle may be equipped with a power storage device having a power storage capacity larger than that of a conventional hybrid vehicle (a hybrid vehicle lacking the external rechargeability) for the purpose of making use of the advantage of charging from the external power source, and may mostly run using solely an electric motor.

However, when applying the technique disclosed in the aforementioned Japanese Patent Laying-Open No. 9-168206 to the externally rechargeable hybrid vehicle, setting the target amount of charge α at a great value may cause the engine to start without sufficiently utilizing charged electric power supplied from the external power source, so that effective utilization of energy is less likely to be fully achieved. Setting the target amount of charge α at a great value will cause the state where the amount of charge of the battery is large to continue. Such state where the amount of charge is constantly large will result in degradation of the battery.

When the user is allowed to set a system state, the setting made by the user may be canceled due to insufficient conditions depending on a vehicle state. Even in such a case, it is desirable for the sake of convenience to hold the setting made by the user, and to bring about the state set by the user once the conditions are satisfied.

DISCLOSURE OF THE INVENTION

The present invention has therefore been made to solve the above problems, and an object of the present invention is to provide a hybrid vehicle capable of effectively utilizing energy.

Another object of the present invention is to provide a hybrid vehicle capable of improving user's convenience.

Still another object of the present invention is to provide a method for controlling a hybrid vehicle capable of effectively utilizing energy.

Still another object of the present invention is to provide a method for controlling a hybrid vehicle capable of improving user's convenience.

According to the present invention, a hybrid vehicle includes a chargeable and dischargeable power storage device, an internal combustion engine, a power generation device, a charging device, an electric motor, a running mode control unit, and a running-mode-change request switch. The power generation device is configured to be capable of generating electric power using kinetic energy produced by the internal combustion engine to charge the power storage device. The charging device is configured to be capable of receiving a supply of electric power from a power source outside the vehicle to charge the power storage device. The electric motor receives a supply of electric power from the power storage device to produce driving force for the vehicle. The running mode control unit controls changing in a running mode including a first mode (EV priority mode) of running without maintaining a state quantity (SOC) indicative of a state of charge of the power storage device and a second mode (HV mode) of running with the state quantity (SOC) maintained at a predetermined target. The running-mode-change request switch is configured to allow a user to request the change in the running mode. When the change to the second mode is requested from the running-mode-change request switch during the first mode, the running mode control unit changes the miming mode to attain the second mode and sets the predetermined target at a value prescribed based on the state quantity (SOC) at a moment of a request for the change to the second mode if the state quantity (SOC) is less than a first prescribed value. The running mode control unit maintains the first mode if the state quantity (SOC) is greater than or equal to the first prescribed value. The present invention allows the vehicle to run while changing between the first mode (EV priority mode) and the second mode (HV mode). If the SOC is less than the first prescribed value when the change to the second mode is requested with the running-mode-change request switch during the first mode, the running mode is changed to attain the second mode, and the SOC target is set at a value prescribed based on the SOC at that moment. This prevents the fuel efficiency from being degraded by unnecessary recovery of the SOC. If the SOC is greater than or equal to the first prescribed value when the change to the second mode is requested during the first mode, the first mode is maintained. Accordingly, the SOC will not be maintained at a value greater than or equal to the first prescribed value.

Therefore, according to the present invention, effective utilization of electric power supplied from a power source outside the vehicle through the charger can be fully achieved. Moreover, the present invention can avoid situations such as where the power storage device is degraded by maintaining the SOC at a great value, or where regenerative electric power cannot be absorbed during braking of the vehicle or reduction in the acceleration on a down slope. Further, a user has discretion to set an SOC desired to be held within a range of values less than the first prescribed value.

Preferably, when the state quantity (SOC) falls below the first prescribed value in the case where the first mode is maintained since the state quantity (SOC) is greater than or equal to the first prescribed value, the running mode control unit changes the running mode to attain the second mode and sets the predetermined target at a value prescribed based on the first prescribed value.

Preferably, if the state quantity (SOC) reaches a second prescribed value less than the first prescribed value, the running mode control unit forcefully changes the running mode to attain the second mode irrespective of an operation input from the running-mode-change request switch.

Still preferably, the running mode control unit sets the predetermined target at a value prescribed based on the second prescribed value.

According to the present invention, a hybrid vehicle includes a chargeable and dischargeable power storage device, an internal combustion engine, a power generation device, an electric motor, a running mode control unit, a running-mode-change request switch, and a reporting unit. The power generation device is configured to be capable of generating electric power using kinetic energy produced by the internal combustion engine to charge the power storage device. The electric motor receives a supply of electric power from the power storage device to produce driving force for the vehicle. The running mode control unit controls changing in a running mode including a first mode (EV priority mode) of running without maintaining a state quantity (SOC) indicative of a state of charge of the power storage device and a second mode (HV mode) of running with the state quantity (SOC) maintained at a predetermined target. The running-mode-change request switch is configured to allow a user to request the change in the running mode. The reporting unit reports to the user a history of an operation input from the running-mode-change request switch irrespective of control of changing the running mode executed by the running mode control unit.

The present invention allows the vehicle to run while changing between the first mode (EV priority mode) and the second mode (HV mode). The reporting unit reports to the user the history of the operation input from the running-mode-change request switch irrespective of actual control of changing the running mode executed by the running mode control unit. The user can thereby identify that the request for the change in the running mode has been recognized by the system.

Therefore, if the request for the change in the running mode is canceled due to insufficient conditions, the present invention can save user's time and effort to repeatedly operate the running-mode-change request switch until the request for the change is accepted, which leads to improved convenience.

Preferably, when the change to the second mode is requested from the running-mode-change request switch during the first mode, the running mode control unit maintains the first mode if the state quantity (SOC) is greater than or equal to a first prescribed value. Even if the first mode is maintained since the state quantity (SOC) is greater than or equal to the first prescribed value, the reporting unit reports that the change to the second mode has been requested from the running-mode-change request switch.

Preferably, when the state quantity (SOC) reaches a second prescribed value less than the first prescribed value, the running mode control unit forcefully changes the running mode to attain the second mode irrespective of the operation input from the running-mode-change request switch. When the running mode is forcefully changed to attain the second mode by the running mode control unit, the reporting unit reports that the running mode has been changed to attain the second mode irrespective of the operation input from the running-mode-change request switch.

According to the present invention, the user can identify that the state quantity (SOC) is close to the lower limit, and can also readily identify the timing in which the power storage device is to be charged again.

Further, according to the present invention, a method for controlling is a method for controlling a hybrid vehicle. The hybrid vehicle includes a chargeable and dischargeable power storage device, an internal combustion engine, a power generation device, a charging device, and an electric motor. The power generation device is configured to be capable of generating electric power using kinetic energy produced by the internal combustion engine to charge the power storage device. The charging device is configured to be capable of receiving a supply of electric power from a power source outside the vehicle to charge the power storage device. The electric motor receives a supply of electric power from the power storage device to produce driving force for the vehicle. The method includes the first to fourth steps. In the first step, during a first mode (EV priority mode) of running without maintaining a state quantity (SOC) indicative of a state of charge of the power storage device, it is determined whether or not a change to a second mode (HV mode) of running with the state quantity (SOC) maintained at a predetermined target has been requested by a user. It is determined in the second step whether or not the state quantity (SOC) is less than a first prescribed value when it is determined that the change to the second mode has been requested. In the third step, the running mode is changed to attain the second mode and the predetermined target is set at a value prescribed based on the state quantity (SOC) at a moment of a request for the change to the second mode, when it is determined that the state quantity (SOC) is less than the first prescribed value. The first mode is maintained in the fourth step when it is determined that the state quantity (SOC) is greater than or equal to the first prescribed value.

Preferably, when it is determined in the second step that the state quantity (SOC) is less than the first prescribed value in the case where the first mode is maintained in the fourth step, then, in the third step, the running mode is changed to attain the second mode, and the predetermined target is set at a value prescribed based on the first prescribed value.

Preferably, the method for controlling further includes the fifth step. In the fifth step, the running mode is forcefully changed to attain the second mode irrespective of the request to change the running mode made by the user when the state quantity (SOC) reaches a second prescribed value less than the first prescribed value.

Still preferably, the predetermined target is set at a value prescribed based on the second prescribed value in the fifth step.

Further, according to the present invention, a method for controlling is a method for controlling a hybrid vehicle. The hybrid vehicle includes a chargeable and dischargeable power storage device, an internal combustion engine, a power generation device, an electric motor, and a running-mode-change request switch. The power generation device is configured to be capable of generating electric power using kinetic energy produced by the internal combustion engine to charge the power storage device. The electric motor receives a supply of electric power from the power storage device to produce driving force for the vehicle. The running-mode-change request switch is configured to allow a user to request a change in a running mode including a first mode (EV priority mode) of running without maintaining a state quantity (SOC) indicative of a state of charge of the power storage device and a second mode (HV mode) of running with the state quantity (SOC) maintained at a predetermined target.

The method includes the first and second steps. In the first step, control of changing the running mode is executed based on an operation input from the running-mode-change request switch. In the second step, a history of the operation input from the running-mode-change request switch is reported to the user irrespective of the control of changing the running mode.

Preferably, the method for controlling further includes the third to fifth steps. In the third step, it is determined whether or not the change to the second mode has been requested from the running-mode-change request switch during the first mode. It is determined in the fourth step whether or not the state quantity (SOC) is greater than or equal to a first prescribed value when it is determined in the third step that the change to the second mode has been requested. The first mode is maintained in the fifth step when it is determined in the fourth step that the state quantity (SOC) is greater than or equal to the first prescribed value. Even if the first mode is maintained in the fifth step, it is reported to the user in the second step that the change to the second mode has been requested from the running-mode-change request switch.

Preferably, the method for controlling further includes the sixth and seventh steps. In the sixth step, the running mode is forcefully changed to attain the second mode irrespective of the operation input from the running-mode-change request switch when the state quantity (SOC) reaches a second prescribed value less than the first prescribed value. It is reported to the user in the seventh step that the running mode has been changed to attain the second mode irrespective of the operation input from the running-mode-change request switch when the running mode is forcefully changed to attain the second mode in the sixth step.

As described above, according to the present invention, effective utilization of electric power supplied from the power source outside the vehicle through the charging device can be fully achieved. Moreover, the present invention can avoid situations such as where the power storage device is degraded, and where regenerative electric power cannot be absorbed during braking of the vehicle or reduction in the acceleration on a down slope. Further, the user has discretion to set an SOC desired to be held within a range of values less than the first prescribed value.

Furthermore, if the request for the change in the running mode is canceled due to insufficient conditions, the present invention can save user's time and effort to repeatedly operate the running-mode-change request switch until the request for the change is accepted, which leads to improved convenience.

BRIEF DESCRIPTION OF THE DRAWINGS

FIG. 11 is a flow chart for explaining control executed by the ECU when the power storage device is charged from an external power source.

FIG. 12 is a diagram showing another configuration of a switch with which a request to change the running mode can be input and displayed.

BEST MODES FOR CARRYING OUT THE INVENTION

Figure 1:
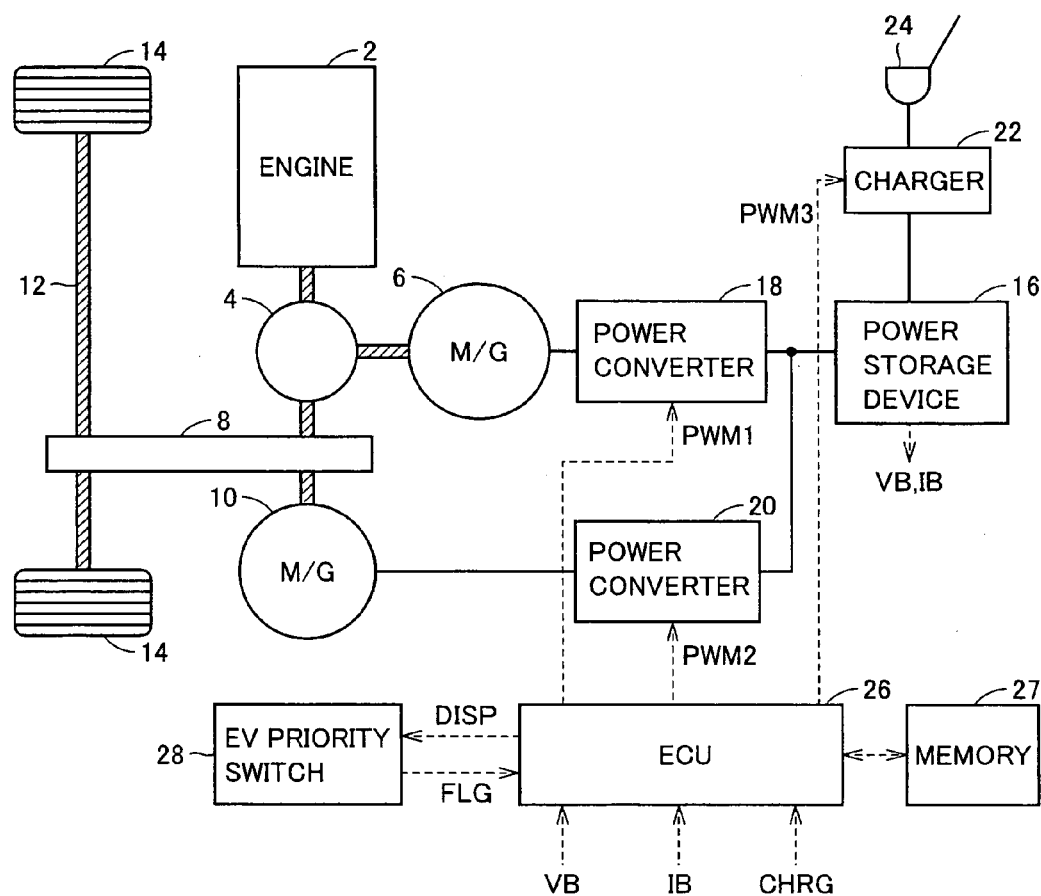
FIG. 1 is an overall block diagram of a hybrid vehicle according to an embodiment of the present invention.

Embodiments of the present invention will be described below in detail with reference to the drawings. In the drawings, the same or corresponding portions are denoted by the same reference characters and description thereof will not be repeated.

FIG. 1 is an overall block diagram of a hybrid vehicle according to an embodiment of the present invention. With reference to FIG. 1, a hybrid vehicle 100 includes an engine 2, a power split device 4, motor generators 6, 10, a transmission gear 8, a drive shaft 12, and wheels 14. Hybrid vehicle 100 further includes a power storage device 16, power converters 18, 20, a charger 22, a charging inlet 24, an ECU (Electronic Control Unit) 26, a memory 27, and an EV priority switch 28.

Power split device 4 is coupled to engine 2, motor generator 6 and transmission gear 8 to distribute motive power among them. For example, a planetary gear having three rotation shafts of a sun gear, a planetary carrier and a ring gear can be used as power split device 4. These three rotation shafts are connected to the rotation shafts of engine 2, motor generator 6 and transmission gear 8, respectively. The rotation shaft of motor generator 10 is coupled to that of transmission gear 8. That is, motor generator 10 and transmission gear 8 share the same rotation shaft, which is connected to the ring gear of power split device 4.

Kinetic energy produced by engine 2 is distributed to motor generator 6 and transmission gear 8 by power split device 4. That is, engine 2 is incorporated into hybrid vehicle 100 as a power source that drives transmission gear 8 transmitting motive power to drive shaft 12 and drives motor generator 6. Motor generator 6 is incorporated into hybrid vehicle 100 to operate as a generator driven by engine 2 and as a motor capable of starting engine 2. Motor generator 10 is incorporated into hybrid vehicle 100 to operate as a power source that drives transmission gear 8 transmitting motive power to drive shaft 12.

Power storage device 16 is a chargeable and dischargeable DC power source, and is implemented by, for example, a nickel-metal hydride, lithium ion or similar secondary battery. Power storage device 16 supplies electric power to power converters 18 and 20. Power storage device 16 is charged with electric power received from power converter(s) 18 and/or 20 during power generation of motor generator(s) 6 and/or 10. Further, power storage device 16 is charged with electric power received through charger 22 during charging from a power source outside the vehicle (hereinafter also referred to as an "external power source"), which is not shown but connected to charging inlet 24. A large-capacitance capacitor may be employed as power storage device 16. Any electric power buffer may be used that can temporarily store electric power generated by motor generators 6 and 10 or electric power from the external power source to supply the stored electric power to motor generators 6 and 10. A voltage VB at power storage device 16 and a current IB flowing in/out of power storage device 16 are detected by sensors not shown, and their detected values are output to ECU 26.

Based on a signal PWM1 from ECU 26, power converter 18 converts electric power generated by motor generator 6 into DC power for output to power storage device 16. Based on a signal PWM2 from ECU 26, power converter 20 converts DC power supplied from power storage device 16 into AC power for output to motor generator 10. At the time of starting engine 2, based on signal PWM1, power converter 18 converts DC power supplied from power storage device 16 into AC power for output to motor generator 6. During braking of the vehicle or reduction in the acceleration on a down slope, power converter 20, based on signal PWM2, converts electric power generated by motor generator 10 into DC power for output to power storage device 16.

Motor generators 6 and 10 are AC motors, and are each implemented by, for example, a three-phase synchronous motor with permanent magnets embedded in a rotor. Motor generator 6 converts kinetic energy produced by engine 2 into electric energy for output to power converter 18. Motor generator 6 generates driving force by three-phase AC power received from power converter 18 to start engine 2.

Motor generator 10 generates driving torque for the vehicle by three-phase AC power received from power converter 20. During braking of the vehicle or reduction in the acceleration on a down slope, motor generator 10 converts mechanical energy stored in the vehicle as kinetic energy or potential energy into electric energy for output to power converter 20.

Engine 2 converts thermal energy produced by fuel combustion into kinetic energy for a movable member such as a piston or a rotor, and outputs the converted kinetic energy to power split device 4. For example, assuming that the movable member is a piston and is making a reciprocating motion, the reciprocating motion is converted into a rotational motion through a so-called crank mechanism, such that the kinetic energy of the piston is transmitted to power split device 4.

Based on a signal PWM3 from ECU 26, charger 22 converts electric power received through charging inlet 24 from the external power source into a voltage level at power storage device 16 for output to power storage device 16. Charging inlet 24 is an external charging interface through which electric power is supplied to power storage device 16 from the external power source.

ECU 26 generates signals PWM1 and PWM2 for driving power converters 18 and 20, respectively, and outputs generated signals PWM1 and PWM2 to power converters 18 and 20, respectively. Upon receipt of a signal CHRG requesting that power storage device 16 is charged through charger 22, ECU 26 generates signal PWM3 for driving charger 22, and outputs generated signal PWM3 to charger 22.

Further, ECU 26 controls a change in the running mode of this hybrid vehicle 100. More specifically, ECU 26 changes between a motor-running priority mode (hereinafter also referred to as an "EV (Electric Vehicle) priority mode") in which priority is given to running using solely motor generator 10 with engine 2 shut down and a hybrid running mode (hereinafter also referred to as an "HV (Hybrid Vehicle) mode") in which engine 2 is operated to maintain a state of charge (hereinafter also referred to as "SOC") of power storage device 16 at a predetermined target. The SOC represents the amount of stored electric power by 0 to 100% with respect to the fully-charged state of power storage device 16, and is indicative of the remaining amount of stored electric power in power storage device 16.

The term "priority" that occurs in the EV priority mode implies running using solely motor generator 10 basically with engine 2 shut down without maintaining the SOC of power storage device 16 at the predetermined target. That is, engine 2 is allowed to operate in situations such as when the driver deeply presses down the accelerator pedal, when an engine-driven-type air conditioner is operated, and during warm-up of the engine.

The EV priority mode of running without maintaining the SOC of power storage device 16 refers to a mode in which the vehicle runs basically with charged electric power in power storage device 16 being consumed by motor generator 10, without starting engine 2 unless the need arises in terms of the driving force. This EV priority mode often results in that discharging has a relatively higher ratio to charging.

The HV mode refers to a running mode in which engine 2 is operated to cause motor generator 6 to generate electric power in order to maintain the SOC of power storage device 16 at the predetermined target, and is not limited to running with engine 2 continuously operated.

Further, ECU 26 receives a signal FLG from EV priority switch 28. This signal FLG varies in accordance with a request to change the running mode input by the user at EV priority switch 28. If it is determined based on signal FLG that the change from the EV priority mode to the HV mode has been requested by the user, ECU 26 outputs the SOC of power storage device 16 at that moment to memory 27. ECU 26 then changes the running mode in accordance with a control configuration which will be described later, based on signal FLG, the SOC of power storage device 16, and the SOC at the moment of the request for the mode change which is stored in memory 27.

Furthermore, based on signal FLG from EV priority switch 28, ECU 26 generates a signal DISP for controlling the on/off state of a display provided for EV priority switch 28, and outputs generated signal DISP to EV priority switch 28. More specifically, EV priority switch 28 is provided with the display which is turned on/off depending on a running mode, as will be described later. While the running mode will not be changed immediately in response to the operation input from EV priority switch 28 depending on an SOC level, ECU 26 controls the on/off state of the display of EV priority switch 28 in response to signal FLG indicative of the request for the mode change made by the user, rather than in response to an actual running mode.

If it is determined by ECU 26 that the change from the EV priority mode to the
HV mode has been requested, memory 27 stores the SOC of power storage device 16 at that moment which is output from ECU 26.

EV priority switch 28 is an interface device for allowing the user to request a change in the running mode and reporting to the user that the request has been recognized by the system. When turned on by the user, EV priority switch 28 activates signal FLG to be output to ECU 26, and when turned off by the user, EV priority switch 28 deactivates signal FLG. After the termination of charging of power storage device 16 through charger 22, the running mode is set by default at the EV priority mode, and EV priority switch 28 is set by default at the on state (i.e., signal FLG is activated).

EV priority switch 28 has the display that can be turned on/off, whose display state is changed in response to signal DISP from ECU 26. Specifically, when turned on by the user (i.e., when the change to the EV priority mode is requested), a lamp of EV priority switch 28 is turned on based on signal DISP, and when turned off by the user (i.e., when the change to the HV mode is requested), the lamp of EV priority switch 28 is turned off based on signal DISP.

Figure 2:
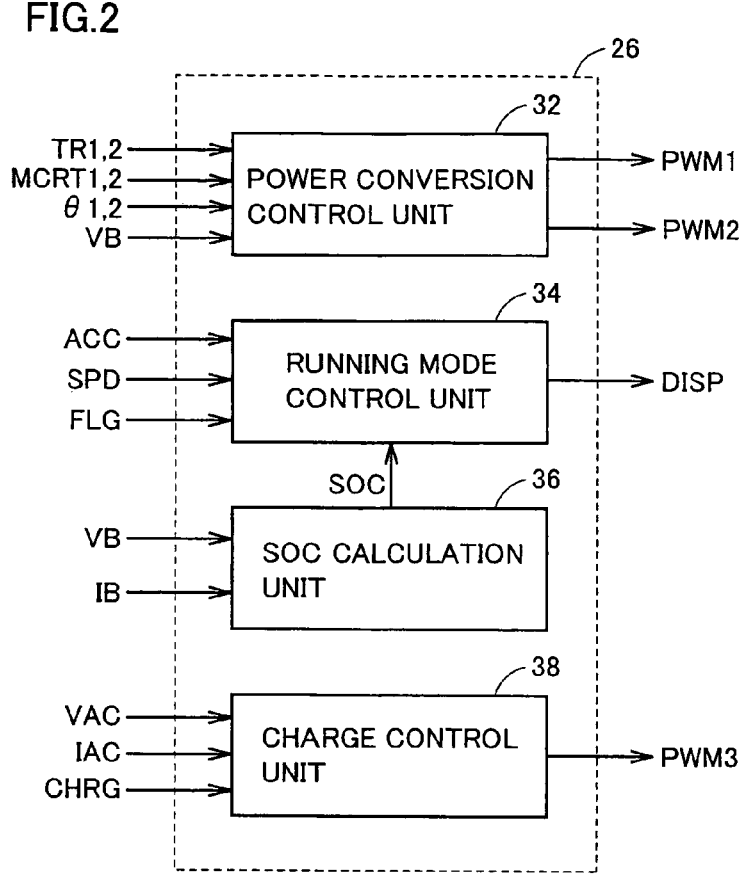
FIG. 2 is a functional block diagram of an ECU shown in FIG. 1.

FIG. 2 is a functional block diagram of ECU 26 shown in FIG. 1. With reference to FIG. 2, ECU 26 includes a power conversion control unit 32, a running mode control unit 34, an SOC calculation unit 36, and a charge control unit 38. Power conversion control unit 32 generates signals PWM1 and PWM2 for driving motor generators 6 and 10, respectively, based on torque command values TR1, TR2, motor currents MCRT1, MCRT2 and rotor rotation positions θ1, θ2 of motor generators 6, 10, and voltage VB at power storage device 16, and outputs generated signals PWM1 and PWM2 to power converters 18 and 20, respectively.

Torque command values TR1 and TR2 are calculated by a torque calculation unit not shown based on an accelerator pedal position, vehicle speed and the like. Each of motor currents MCRT1, MCRT2, rotor rotation positions θ1, θ2, and voltage VB is detected by a sensor not shown.

Running mode control unit 34 controls the change in the running mode based on signal FLG from EV priority switch 28 and a signal SOC from SOC calculation unit 36 indicative of the SOC of power storage device 16. Specifically, when it is determined that the change to the HV mode has been requested based on signal FLG during the EV priority mode, running mode control unit 34 changes the running mode to attain the HV mode and sets an SOC target value at a value prescribed based on the SOC at the moment of the request for the change to the HV mode, if the SOC of power storage device 16 indicated by signal SOC is less than a prescribed threshold value Sth1. Running mode control unit 34 maintains the EV priority mode if the SOC of power storage device 16 is greater than or equal to threshold value Sth1.

If the SOC of power storage device 16 indicated by signal SOC reaches a prescribed threshold value Sth2 (<Sth1), running mode control unit 34 forcefully changes the running mode to attain the HV mode irrespective of signal FLG.

Running mode control unit 34 then determines whether or not engine 2 is to be operated based on an accelerator-pedal-position signal ACC indicative of an accelerator pedal position, a vehicle speed signal SPD indicative of a vehicle speed, a selected running mode, and signal SOC indicative of the SOC of power storage device 16. Specifically, running mode control unit 34 calculates power required for driving the vehicle based on accelerator-pedal-position signal ACC and vehicle speed signal SPD, and calculates a charge/discharge demand amount for power storage device 16 based on the SOC of power storage device 16 using a charge/discharge map prescribed beforehand. During the EV priority mode, the charge demand amount is zero. Running mode control unit 34 then adds the charge/discharge demand amount to the power required for driving to obtain an engine output demand value, and determines whether or not engine 2 is to be operated based on whether or not the obtained engine output demand value exceeds a predetermined threshold value.

Figure 3:
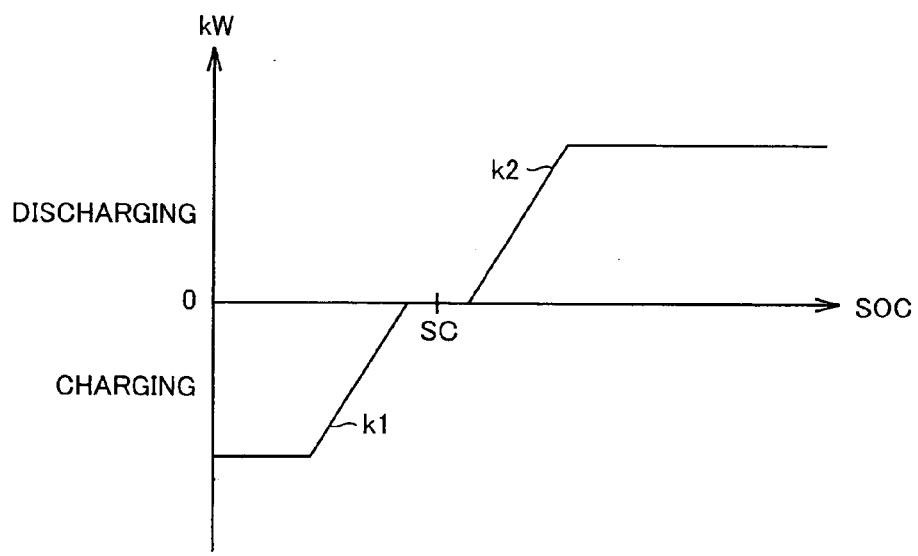
FIG. 3 is a diagram showing a charge/discharge map defining charging and discharging of a power storage device.

FIG. 3 is a diagram showing a charge/discharge map defining charging and discharging of power storage device 16. With reference to FIG. 3, the horizontal axis represents the SOC of power storage device 16, while the vertical axis represents charged/discharged electric power in power storage device 16. This map defines the charge/discharge demand amount for power storage device 16 for controlling the SOC of power storage device 16 to be close to a target value SC during the HV mode. Specifically, if the SOC falls below target value SC, a charge demand amount is defined following a line k1 in accordance with the SOC. During the EV priority mode, this charge/discharge map is not applied, and the charge demand amount is zero.

Figure 4:
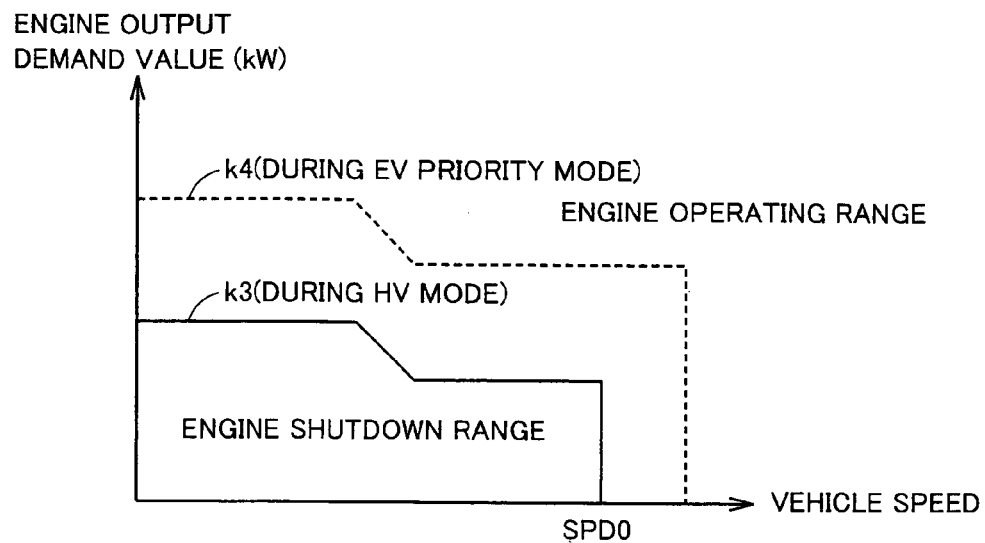
FIG. 4 is a diagram for explaining determination of operation of an engine.

FIG. 4 is a diagram for explaining determination of operation of engine 2. With reference to FIG. 4, the vertical axis represents the aforementioned engine output demand value, while the horizontal axis represents the vehicle speed. A threshold value k3 indicated by the solid line represents a threshold value at which the engine is operated/shut down during the HV mode. If the engine output demand value is less than or equal to threshold value k3, it is determined that the vehicle should run with engine 2 shut down, and if the engine output demand value exceeds threshold value k3, it is determined that the vehicle should run with engine 2 operating. This threshold value varies in accordance with the vehicle speed. For example, the threshold value is great at low vehicle speeds, and attains zero when the vehicle speed exceeds a prescribed value SPD0.

A threshold value k4 indicated by the dotted line represents a threshold value at which the engine is operated/shut down during the EV priority mode. Specifically, during the EV priority mode, an engine shutdown range is enlarged, and priority is given to running using solely motor generator 10 with engine 2 shut down.

Referring back to FIG. 2, if it is determined that engine 2 is to be operated in accordance with the above-described determination of operation of engine 2, running mode control unit 34 starts engine 2. If it is determined that engine 2 is to be shut down in accordance with the above-described determination of operation, running mode control unit 34 shuts down engine 2.

If it is determined that the EV priority mode has been requested by the user based on signal FLG from EV priority switch 28, running mode control unit 34 activates signal DISP to be output to EV priority switch 28, and if it is determined that the HV mode has been requested by the user, running mode control unit 34 deactivates signal DISP. After the termination of charging of power storage device 16 through charger 22, running mode control unit 34 sets by default the running mode at the EV priority mode, and activates signal DISP.

SOC calculation unit 36 calculates the SOC of power storage device 16 based on the respective detected values of current IB and voltage VB at power storage device 16, and outputs signal SOC indicative of the calculated SOC to running mode control unit 34. Calculation of the SOC can be performed with any of various publicly-known techniques.

If signal CHRG requesting charging of power storage device 16 through charger 22 is activated, charge control unit 38 generates signal PWM3 for driving charger 22 based on respective detected values of a voltage VAC and a current IAC of electric power fed through charging inlet 24, and outputs signal PWM3 to charger 22. Voltage VAC and current IAC are detected by sensors not shown, respectively.

Figure 5:
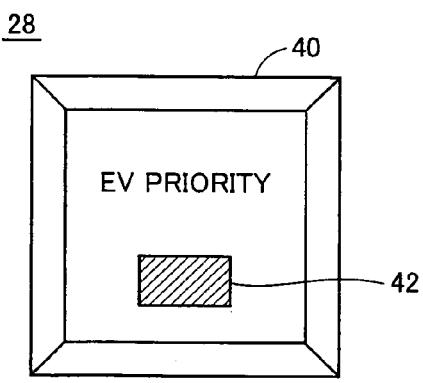
FIG. 5 is an outline drawing of an EV priority switch shown in FIG. 1.
Figure 6:
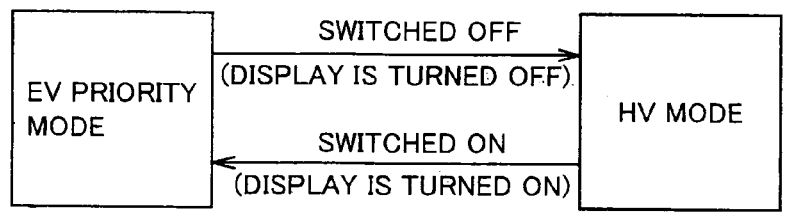
FIG. 6 is a state transition diagram showing the relationship of the operation of the EV priority switch with a request to change a running mode and a display state of a display.

FIG. 5 is an outline drawing of EV priority switch 28 shown in FIG. 1. FIG. 6 is a state transition diagram showing the relationship of the operation of EV priority switch 28 with a request to change the running mode and a display state of a display 42. With reference to FIGS. 5 and 6, EV priority switch 28 includes an operating unit 40 and display 42. Operating unit 40 is implemented by a push button, and configured to be capable of requesting a change in the running mode in accordance with an on/off operation. Display 42 is turned on/off in accordance with a running mode requested by the on/off operation of operating unit 40.

Specifically, when operating unit 40 is turned off (switched off) during the EV priority mode (with display 42 turned on), the request for the change to the HV mode is accepted, and display 42 is turned off. Turning off of display 42 allows the user to identify that the request for the change to the HV mode has been recognized by the system. When operating unit 40 is turned on (switched on) during the HV mode (with display 42 turned off), the request for the change to the EV priority mode is accepted, and display 42 is turned on. Turning on of display 42 allows the user to identify that the request for the change to the EV priority mode has been recognized by the system.

Figure 7:
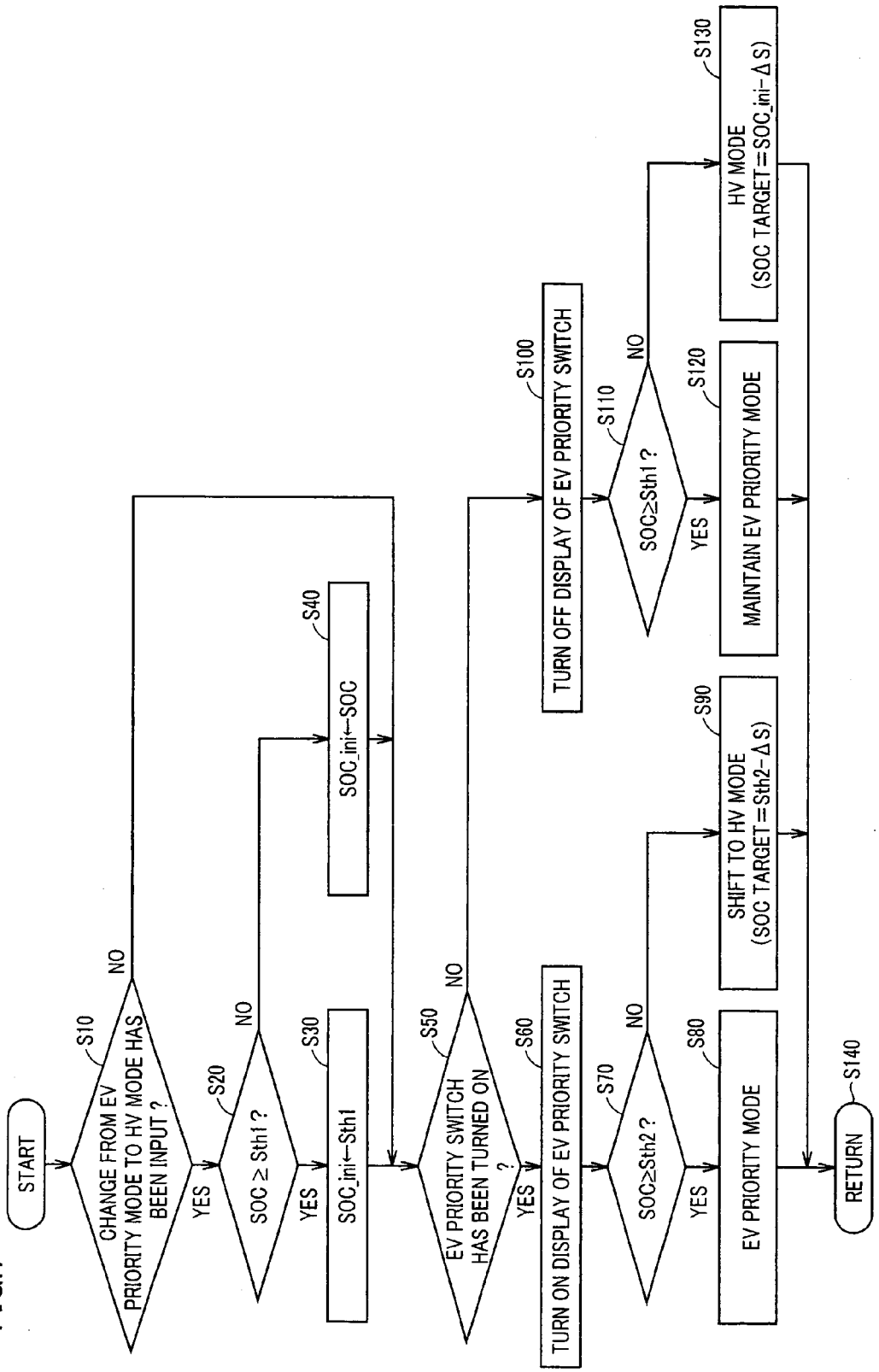
FIG. 7 is a flow chart for explaining control of changing the running mode executed by the ECU shown in FIG. 1.

FIG. 7 is a flow chart for explaining control of changing the running mode executed by ECU 26 shown in FIG. 1. The process in this flow chart is invoked from a main routine and executed at regular time intervals or each time predetermined conditions are met, in the state where the vehicle is allowed to run (e.g., when the vehicle system is activated).

With reference to FIG. 7, based on signal FLG from EV priority switch 28, ECU 26 determines whether or not the change from the EV priority mode to the HV mode has been input from EV priority switch 28 (step S10). If it is determined that the change to the HV mode has been input (YES in step S10), ECU 26 determines whether or not the SOC of power storage device 16 is greater than or equal to threshold value Sth1 (step S20). This threshold value Sth1 is set so as to prevent the running mode from being changed to attain the HV mode with the SOC being great, as will be described later.

If it is determined in step S20 that the SOC is greater than or equal to threshold value Sth1 (YES in step S20), ECU 26 stores threshold value Sth1 in SOC_ini, and outputs the SOC_ini to memory 27 (step S30). If it is determined in step S20 that the SOC is less than threshold value Sth1 (NO in step S20), ECU 26 stores the SOC at that moment in SOC_ini, and outputs the SOC_ini to memory 27 (step S40).

If it is determined in step S10 that the change in the running mode has not been input (NO in step S10), ECU 26 proceeds the process into step S50.

ECU 26 then determines, based on signal FLG from EV priority switch 28, whether or not EV priority switch 28 has been turned on, that is, the EV priority mode has been requested (step S50). If it is determined that EV priority switch 28 has been turned on (YES in step S50), ECU 26 activates signal DISP to be output to EV priority switch 28, so that display 42 of EV priority switch 28 is turned on (step S60).

ECU 26 then determines whether or not the SOC of power storage device 16 is greater than or equal to threshold value Sth2 (step S70). This threshold value Sth2 is set so as to prevent power storage device 16 from being over-discharged, and set at a value less than threshold value Sth1.

If it is determined that the SOC is greater than or equal to threshold value Sth2 (YES in step S70), ECU 26 changes the running mode to attain the EV priority mode (step S80). If it is determined that the SOC is less than threshold value Sth2 (NO in step S70), ECU 26 forcefully changes the running mode to attain the HV mode, and sets the SOC target at threshold value Sth2−ΔS (step S90). ΔS is set so as to prevent the running mode from being changed frequently with respect to threshold value Sth2.

If it is determined in step S50 that EV priority switch 28 has been turned off (NO in step S50), ECU 26 deactivates signal DISP, so that display 42 of EV priority switch 28 is turned off (step S100).

ECU 26 then determines whether or not the SOC of power storage device 16 is greater than or equal to threshold value Sth1 (step S110). This threshold value Sth1 is set so as to prevent the running mode from being changed to attain the HV mode with the SOC being great. Specifically, if the running mode is changed to attain the HV mode with the SOC being great, the SOC is maintained great, which results in degradation of power storage device 16 and failure to absorb regenerative electric power during braking of the vehicle or reduction in the acceleration on a down slope.

If it is determined in step S110 that the SOC is greater than or equal to threshold value Sth1 (YES in step S110), ECU 26 maintains the EV priority mode without changing the running mode to attain the HV mode (step S120). If it is determined in step S110 that the SOC of power storage device 16 is less than threshold value Sth1 (NO in step S110), ECU 26 changes the running mode to attain the HV mode, and sets the SOC target at SOC_ini−ΔS (step S130).

Specifically, if the change from the EV priority mode to the HV mode is requested from EV priority switch 28 when the SOC of power storage device 16 is less than threshold value Sth1, the SOC is controlled to be close to the SOC at the moment of the request for the change (SOC_ini−ΔS) since the SOC at the moment of the request for the change has been stored in SOC_ini. If the change from the EV priority mode to the HV mode is requested when the SOC is greater than or equal to threshold value Sth1, the SOC is controlled to be close to threshold value Sth1 (Sth1−ΔS) since threshold value Sth1 has been stored in SOC_ini.

Figure 8:
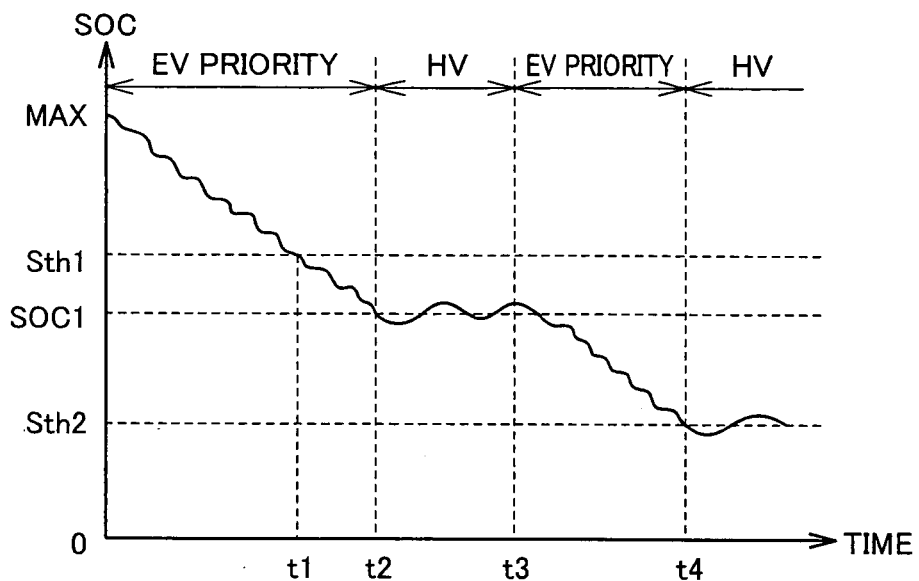
FIG. 8 is a diagram showing an example of variations in an SOC of the power storage device.

FIG. 8 is a diagram showing an example of variations in the SOC of power storage device 16. With reference to FIG. 8, hybrid vehicle 100 is assumed to start running after power storage device 16 is fully charged from the external power source through charger 22. After fully charging power storage device 16, the running mode is set by default at the EV priority mode. While running during the EV priority mode, the SOC generally decreases as the running distance increases, although the SOC temporarily increases by the presence of regenerative electric power recovered during deceleration of the vehicle or reduction in the acceleration on a down slope.

Assume that the SOC falls below threshold value Sth1 at time t1, and that the request for the change from the EV priority mode to the HV mode is input from EV priority switch 28 at time t2 when the SOC has a value 1. Then, the running mode is changed to attain the HV mode, in which the SOC is controlled to be close to the SOC (value 1) at the moment when the change in the running mode is requested.

Subsequently, assume that the request for the change from the HV mode to the EV priority mode is input from EV priority switch 28 at time t3. Then, the running mode is changed to attain the EV priority mode, in which the SOC generally decreases as the running distance increases. If the SOC reaches threshold value Sth2 at time t4, the running mode is forcefully changed to attain the HV mode, in which the SOC is controlled to be close to threshold value Sth2.

Figure 9:
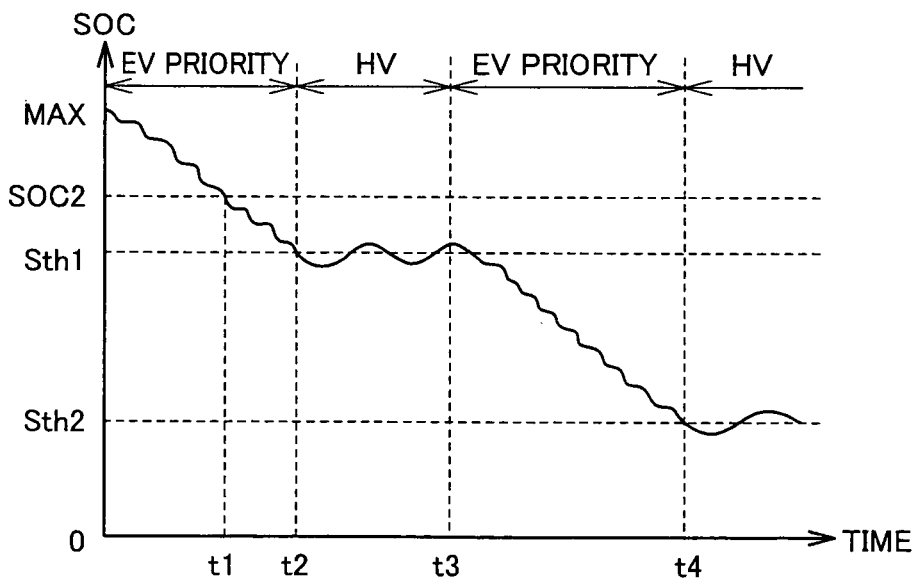
FIG. 9 is a diagram showing another example of variations in the SOC of the power storage device.

FIG. 9 is a diagram showing another example of variations in the SOC of power storage device 16. With reference to FIG. 9, similarly to the case shown in FIG. 8, after fully charging power storage device 16 from the external power source, the running mode is set by default at the EV priority mode. Assume that the request to change from the EV priority mode to the HV mode is input from EV priority switch 28 at time t1 when the SOC has a value 2. In this case, the EV priority mode is maintained since value SOC2 is greater than threshold value Sth1.

If the SOC falls below threshold value Sth1 at time t2, the running mode is changed to attain the HV mode based on the request for the change made at time t1, in which the SOC is controlled to be close to threshold value Sth1. The description with reference to FIG. 8 applies as of time t3.

As described above, according to the present embodiment, if the change to the HV mode is requested by turning off EV priority switch 28 during the EV priority mode when the SOC is less than threshold value Sth1, the running mode is changed to attain the HV mode, and the SOC target is set at a value prescribed based on the SOC at that moment (SOC−ΔS). This prevents the fuel efficiency from being degraded by unnecessary recovery of the SOC. If the SOC is greater than or equal to threshold value Sth1 at the moment of the request for the change to the HV mode, the EV priority mode is maintained. Accordingly, the SOC will not be maintained at values greater than or equal to threshold value Sth1.

Therefore, according to the present embodiment, effective utilization of electric power supplied from the external power source through charger 22 can be fully achieved. Moreover, the present invention can avoid situations such as where power storage device 16 is degraded by maintaining the SOC at a great value, and where regenerative electric power cannot be absorbed during braking of the vehicle or reduction in the acceleration on a down slope. Further, the user has discretion to set an SOC desired to be held within a range of values less than threshold value Sth1. Accordingly, electric power for the EV priority mode can be ensured previously, which enables running with the EV priority mode in the neighborhood of the user's house on the way home, for example.

Moreover, according to the present embodiment in which the running mode is forcefully changed to attain the HV mode when the SOC reaches threshold value Sth2 irrespective of the operation input from EV priority switch 28, power storage device 16 can be prevented from being over-discharged.

Further, according to the present embodiment in which a history of the operation input from EV priority switch 28 is displayed on display 42 irrespective of actual control of changing the running mode, the user can identify that the request for the change in the running mode has been recognized by the system. Therefore, even if the request for the change in the running mode is canceled due to insufficient conditions, the present embodiment can save user's time and effort to repeatedly operate EV priority switch 28 until the request for the change is accepted, which leads to improved convenience.

[Modification]

In the above-described embodiment, the display state of the display of EV priority switch 28 corresponds to a running mode requested by the user, rather than an actual running mode. However, if the SOC of power storage device 16 reaches threshold value Sth2, the change to the EV priority mode will not be made unless power storage device 16 is charged from the external power source through charger 22. Therefore, according to this modification, if the SOC reaches threshold value Sth2, the running mode is forcefully changed to attain the HV mode, and the lamp of EV priority switch 28 is turned off to report to the user that the running mode has been forcefully changed to attain the HV mode.

Figure 10:
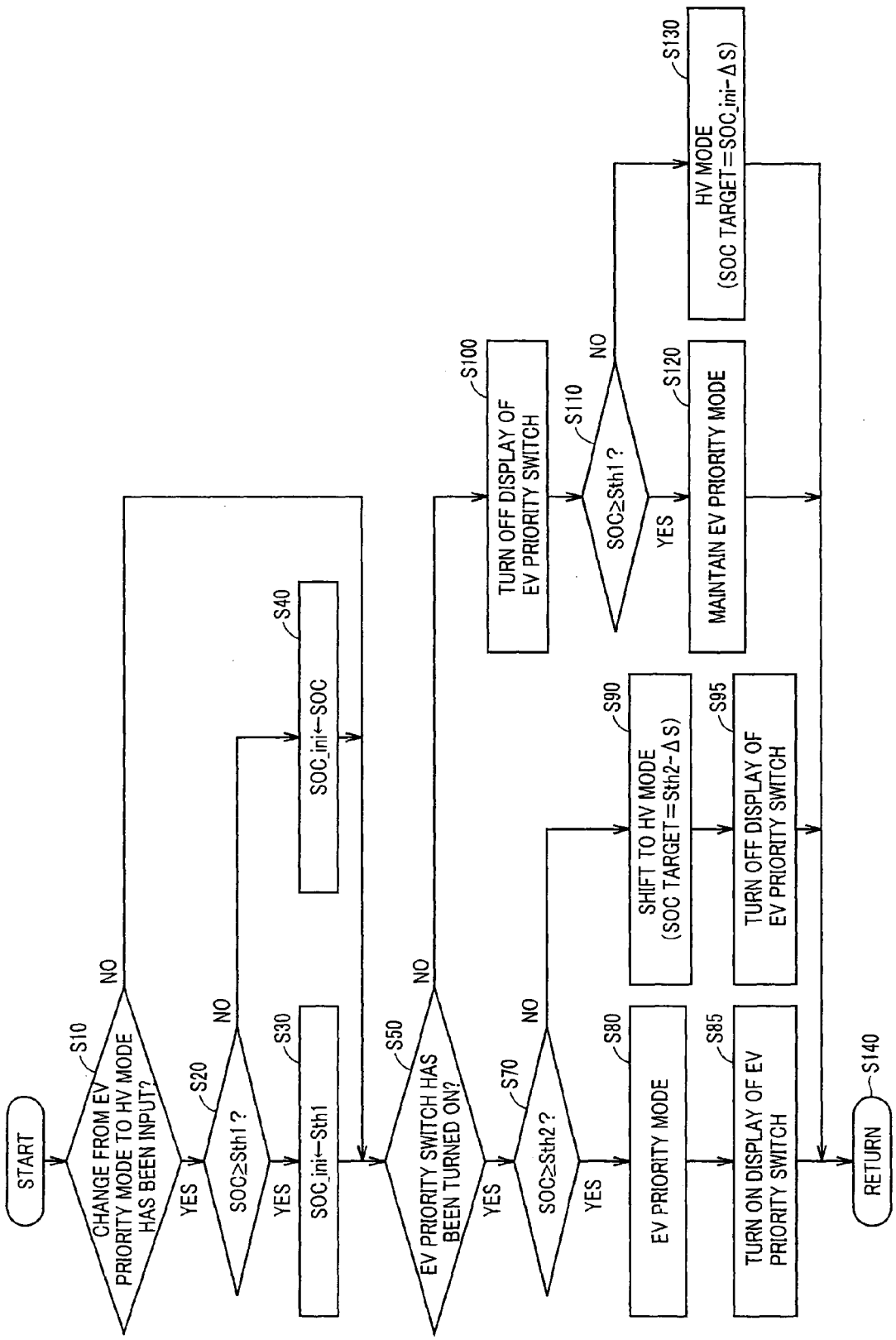
FIG. 10 is a flow chart for explaining control of changing the running mode executed by the ECU according to a modification.

FIG. 10 is a flow chart for explaining control of changing the running mode executed by ECU 26 according to this modification. With reference to FIG. 10, this flow chart includes steps S85 and S95 instead of step S60 in the flow chart shown in FIG. 7. Specifically, if the running mode is changed to attain the EV priority mode in step S80, ECU 26 activates signal DISP to be output to EV priority switch 28 to turn on display 42 of EV priority switch 28 (step S85).

If it is determined in step S50 that EV priority switch 28 has been turned on, and if it is determined in step S70 that the SOC of power storage device 16 is less than threshold value Sth2, the running mode is forcefully changed to attain the HV mode in step S90. ECU 26 then deactivates signal DISP to be output to EV priority switch 28 to turn off display 42 of EV priority switch 28 (step S95).

In this manner, if the SOC of power storage device 16 reaches threshold value Sth2, display 42 of EV priority switch 28 is turned off irrespective of a user's intention. If power storage device 16 is charged from the external power source through charger 22 to cause the SOC to exceed a threshold value Sth3 (>Sth2), ECU 26 turns on display 42 again.

FIG. 11 is a flow chart for explaining control executed by ECU 26 when power storage device 16 is charged from the external power source. The process in this flow chart is invoked from a main routine and executed at regular time intervals or each time predetermined conditions are met.

With reference to FIG. 11, ECU 26 determines whether or not power storage device 16 is to be charged from the external power source connected to charging inlet 24 through charger 22 (step S210). If it is determined that power storage device 16 is to be charged (YES in step S210), ECU 26 generates signal PWM3 for driving charger 22 for output to charger 22, thereby charging power storage device 16 (step S220).

ECU 26 then determines whether or not the SOC of power storage device 16 has exceeded threshold value Sth3 (step S230). This threshold value Sth3 is set at a value greater than threshold value Sth2. If it is determined that the SOC has exceeded threshold value Sth3 (YES in step S230), ECU 26 changes the running mode to attain the EV priority mode (step S240), and activates signal DISP to be output to EV priority switch 28 to turn on display 42 of EV priority switch 28 (step S250). If it is determined in step S230 that the SOC is less than or equal to threshold value Sth3 (NO in step S230), ECU 26 proceeds the process into step S260 without executing steps S240 and S250.

ECU 26 then determines whether or not charging of power storage device 16 from the external power source has been terminated (step S260). If it is determined that charging has not been terminated (NO in step S260), ECU 26 returns the process to step S220 again. If it is determined that charging has been terminated (YES in step S260), ECU 26 proceeds the process into step S270 to terminate the series of steps.

In this manner, according to this modification, if the SOC of power storage device 16 reaches threshold value Sth2, the running mode is forcefully changed to attain the HV mode, and display 42 of EV priority switch 28 is also forcefully turned off. This can prevent display 42 of EV priority switch 28 from being turned on despite that the EV priority mode can no longer be continued.

In the above-described embodiment, EV priority switch 28 is a switch intended to turn on/off the EV priority mode (i.e., the HV mode is attained when the EV priority mode is turned off). Display 42 is turned on during the EV priority mode, and turned off when the EV priority mode is not attained, i.e., during the HV mode. However, the switch for requesting a change in the running mode is not limited to such switch.

FIG. 12 is a diagram showing another configuration of a switch with which a request to change the running mode can be input and displayed. With reference to FIG. 12, this switch 28A includes operating unit 40 and displays 42, 44. Operating unit 40 is implemented by a push button, and configured to be capable of requesting a change in the running mode in accordance with an on/off operation. Display 42 is turned on when the EV priority mode is requested by the operation of operating unit 40, and turned off when the HV mode is requested. Display 44 is turned on when the HV mode is requested by the operation of operating unit 40, and turned off when the EV priority mode is requested.

At EV priority switches 28 and 28A, operating unit 40 may be protruded by varying degrees in accordance with a running mode requested by the user. Display 42 of EV priority switch 28 or displays 42, 44 of EV priority switch 28A may be positioned on an instrument panel. An indication such as "Maintain SOC" may be employed to show that the HV mode is attained.

While the above embodiment has been addressed to the hybrid vehicle in which power storage device 16 can be charged from the external power source through charger 22, the scope of application of the present invention is not necessarily limited to such externally rechargeable hybrid vehicle. Particularly, EV priority switches 28 and 28A are also effectively applicable to a hybrid vehicle that is not externally rechargeable.

While the above embodiment has described that power storage device 16 is charged from the external power source through dedicated charger 22, the technique for charging power storage device 16 from the external power source is not limited to that described above. For example, a pair of electric power lines connected to charging inlet 24 may be connected to neutral points of motor generators 6, 10, so that electric power from the external power source supplied through charging inlet 24 to the neutral points of motor generators 6, 10 is converted by power converters 18, 20 to thereby charge power storage device 16.

While the above embodiment has described a series/parallel-type hybrid vehicle in which the motive power of engine 2 divided by power split device 4 can be transmitted to the transmission gear and motor generator 6, the present invention is also applicable to other types of hybrid vehicles. Specifically, the present invention is also applicable to, but not limited to, a series-type hybrid vehicle in which engine 2 is used solely to drive motor generator 6 and the driving force for the vehicle is produced solely by motor generator 10, a hybrid vehicle in which only regenerative energy out of kinetic energy generated by engine 2 is recovered as electric energy, and a motor assist-type hybrid vehicle mainly powered by the engine and assisted by a motor as necessary.

In the foregoing, engine 2 corresponds to an embodiment of "an internal combustion engine" according to the present invention. Motor generator 6 and power converter 18 constitute an embodiment of "a power generation device" according to the present invention. Charger 22 and charging inlet 24 constitute an embodiment of "a charging device" according to the present invention. Motor generator 10 corresponds to an embodiment of "a motor" according to the present invention. EV priority switches 28 and 28A correspond to an embodiment of "a running-mode-change request switch" according to the present invention. Display 42 of EV priority switches 28 as well as displays 42 and 44 of EV priority switches 28A correspond to an embodiment of "a reporting unit" according to the present invention.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A hybrid vehicle comprising:
   a chargeable and dischargeable power storage device;
   an internal combustion engine;
   a power generation device configured to be capable of generating electric power using kinetic energy produced by said internal combustion engine to charge said power storage device;
   a charging device configured to be capable of receiving a supply of electric power from a power source outside the vehicle to charge said power storage device;
   an electric motor for receiving a supply of electric power from said power storage device to produce driving force for the vehicle;
   a running mode control unit for controlling changing in a running mode including a first mode of running without maintaining a state quantity indicative of a state of charge of said power storage device and a second mode of running with said state quantity maintained at a predetermined target; and
   a running-mode-change request switch configured to allow a user to request a change in said running mode, wherein
   when the change to said second mode is requested from said running-mode-change request switch during said first mode, said running mode control unit changes said running mode to attain said second mode if said state quantity is less than a first prescribed value, and said running mode control unit maintains said first mode if said state quantity is greater than or equal to said first prescribed value.

2. The hybrid vehicle according to claim 1, wherein when said state quantity falls below said first prescribed value in the case where said first mode is maintained since said state quantity is greater than or equal to said first prescribed value, said running mode control unit changes said running mode to attain said second mode and sets said predetermined target at a value prescribed based on said first prescribed value.

3. The hybrid vehicle according to claim 1, wherein when said state quantity reaches a second prescribed value less than said first prescribed value, said running mode control unit forcefully changes said running mode to attain said second mode irrespective of an operation input from said running-mode-change request switch.

4. The hybrid vehicle according to claim 3, wherein said running mode control unit sets said predetermined target at a value prescribed based on said second prescribed value.

5. The hybrid vehicle according to claim 1, wherein when the change to said second mode is requested from said running-mode-change request switch during said first mode, said running mode control unit changes said running mode to attain said second mode and sets said predetermined target at a value prescribed based on said state quantity at a moment of the request for the change to said second mode if said state quantity is less than a first prescribed value.

6. The hybrid vehicle according to claim 1, wherein said running mode control unit sets said running mode at said first mode after a termination of charging of said power storage device through said charging device.

7. The hybrid vehicle according to claim 1, wherein said running-mode-change request switch is set at said first mode after a termination of charging of said power storage device through said charging device.

8. The hybrid vehicle according to claim 1, wherein
   it is determined, based on an output demand value of said internal combustion engine and a vehicle speed, whether to cause running with said internal combustion engine operated or shut down, and
   during said first mode, a range of running with said internal combustion engine shut down is rendered larger than in said second mode.

9. The hybrid vehicle according claim 1, further comprising a reporting unit for reporting to the user a history of an operation input from said running-mode-change request switch irrespective of the control of changing said running mode executed by said running mode control unit.

10. The hybrid vehicle according to claim 1, wherein
   when said state quantity reaches a second prescribed value less than said first prescribed value, said running mode control unit forcefully changes said running mode to attain said second mode irrespective of an operation input from said running-mode-change request switch, the hybrid vehicle further comprising a reporting unit for reporting that said running mode has been changed to attain said second mode irrespective of the operation input from said running-mode-change request switch when said running mode is forcefully changed to attain said second mode by said running mode control unit.

11. The hybrid vehicle according to claim 1, wherein
a charge/discharge map is provided that defines a charge/discharge demand amount for said power storage device in order to maintain said state quantity at said predetermined target, and
during said first mode, the charge demand amount for said power storage device is set at zero.

12. A hybrid vehicle comprising:
a chargeable and dischargeable power storage device;
an internal combustion engine;
a power generation device configured to be capable of generating electric power using kinetic energy produced by said internal combustion engine to charge said power storage device;
an electric motor for receiving a supply of electric power from said power storage device to produce driving force for the vehicle;
a running mode control unit for controlling changing in a running mode including a first mode of running without maintaining a state quantity indicative of a state of charge of said power storage device and a second mode of running with said state quantity maintained at a predetermined target;
a running-mode-change request switch configured to allow a user to request the change in said running mode; and
a reporting unit for reporting to the user a history of an operation input from said running-mode-change request switch irrespective of control of changing said running mode executed by said running mode control unit, wherein
when the change to said second mode is requested from said running-mode-change request switch during said first mode, said running mode control unit maintains said first mode if said state quantity is greater than or equal to a first prescribed value, and
even if said first mode is maintained since said state quantity is greater than or equal to said first prescribed value, said reporting unit reports that the change to said second mode has been requested from said running-mode-change request switch.

13. The hybrid vehicle according to claim 12, wherein
when said state quantity reaches a second prescribed value less than said first prescribed value, said running mode control unit forcefully changes said running mode to attain said second mode irrespective of the operation input from said running-mode-change request switch, and
when said running mode is forcefully changed to attain said second mode by said running mode control unit, said reporting unit reports that said running mode has been changed to attain said second mode irrespective of the operation input from said running-mode-change request switch.

14. A method for controlling a hybrid vehicle, wherein
said hybrid vehicle comprises:
a chargeable and dischargeable power storage device;
an internal combustion engine;
a power generation device configured to be capable of generating electric power using kinetic energy produced by said internal combustion engine to charge said power storage device;
a charging device configured to be capable of receiving a supply of electric power from a power source outside the vehicle to charge said power storage device; and
an electric motor for receiving a supply of electric power from said power storage device to produce driving force for the vehicle,
said method comprising:
a first step of, during a first mode of running without maintaining a state quantity indicative of a state of charge of said power storage device, determining whether or not a change to a second mode of running with said state quantity maintained at a predetermined target has been requested by a user;
a second step of determining whether or not said state quantity is less than a first prescribed value when it is determined that the change to said second mode has been requested;
a third step of changing said running mode to attain said second mode when it is determined that said state quantity is less than said first prescribed value; and
a fourth step of maintaining said first mode when it is determined that said state quantity is greater than or equal to said first prescribed value.

15. The method for controlling a hybrid vehicle according to claim 14, wherein when it is determined in said second step that said state quantity is less than said first prescribed value in the case where said first mode is maintained in said fourth step, then, in said third step, said running mode is changed to attain said second mode, and said predetermined target is set at a value prescribed based on said first prescribed value.

16. The method for controlling a hybrid vehicle according to claim 14, further comprising a fifth step of forcefully changing said running mode to attain said second mode irrespective of the request to change said running mode made by the user when said state quantity reaches a second prescribed value less than said first prescribed value.

17. The method for controlling a hybrid vehicle according to claim 16, wherein said predetermined target is set at a value prescribed based on said second prescribed value in said fifth step.

18. The method for controlling a hybrid vehicle according to claim 14, wherein, in said third step, said running mode is changed to attain said second mode and said predetermined target is set at a value prescribed based on said state quantity at a moment of the request for the change to said second mode, when it is determined that said state quantity is less than said first prescribed value.

19. A method for controlling a hybrid vehicle, wherein
said hybrid vehicle comprises:
a chargeable and dischargeable power storage device;
an internal combustion engine;
a power generation device configured to be capable of generating electric power using kinetic energy produced by said internal combustion engine to charge said power storage device;
an electric motor for receiving a supply of electric power from said power storage device to produce driving force for the vehicle; and
a running-mode-change request switch configured to allow a user to request a change in a running mode including a first mode of running without maintaining a state quantity indicative of a state of charge of said power storage device and a second mode of running with said state quantity maintained at a predetermined target, said method comprising:
a first step of executing control of changing said running mode based on an operation input from said running-mode-change request switch;
a second step of reporting to the user a history of the operation input from said running-mode-change request switch irrespective of the control of changing said running mode;
a third step of determining whether or not the change to said second mode has been requested from said running-mode-change request switch during said first mode;
a fourth step of determining whether or not said state quantity is greater than or equal to a first prescribed value when it is determined in said third step that the change to said second mode has been requested; and
a fifth step of maintaining said first mode when it is determined in said fourth step that said state quantity is greater than or equal to said first prescribed value, wherein
even if said first mode is maintained in said fifth step, it is reported to the user in said second step that the change to said second mode has been requested from said running-mode-change request switch.

20. The method for controlling a hybrid vehicle according to claim 19, further comprising:
a sixth step of forcefully changing said running mode to attain said second mode irrespective of the operation input from said running-mode-change request switch when said state quantity reaches a second prescribed value less than said first prescribed value; and
a seventh step of reporting to the user that said running mode has been changed to attain said second mode irrespective of the operation input from said running-mode-change request switch when said running mode is forcefully changed to attain said second mode in said sixth step.

* * * * *